United States Patent

[11] 3,630,825

[72] Inventor John R. Marecek
Midland, Mich.
[21] Appl. No. 838,323
[22] Filed July 1, 1969
[45] Patented Dec. 28, 1971
[73] Assignee Dow Corning Corporation
Midland, Mich.

[54] COUPLING AGENT FOR EPOXY RESIN COMPOSITE ARTICLES
6 Claims, No Drawings

[52] U.S. Cl. .................................................. 161/185, 161/266, 252/312
[51] Int. Cl. .................................................. B32b 17/04, B32b 27/38
[50] Field of Search .......................................... 252/312; 161/185, 206

Primary Examiner—Harold Ansher
Attorneys—Robert F. Fleming, Jr., Laurence R. Hobey, Harry D. Dingman and Jack E. Moermond ABSTRACT: There is disclosed a coupling agent useful for the preparation of epoxy resin composite articles which is an aqueous dispersion of a copolymer consisting essentially of from 33 to 86 percent by weight of $C_6H_5(CH_3)SiO$ units and 14 to 67 percent by weight of $R_2N-A-SiO_{3/2}$ units, wherein each R is selected from the group consisting of the hydrogen atom, alkyl radicals containing from one to six carbon atoms and aminoalkyl radicals containing from two to six carbon atoms and A is an alkylene radical containing from three to 10 carbon atoms, and the nitrogen atom of the $R_2N-$ group is attached to at least the third carbon atom of the A radical removed from the silicon atom. An aqueous dispersion of the fatty acid amine salt of the copolymer defined above can also be employed. The composite articles consist essentially of (1) a base member selected from the group consisting of glass cloth and glass fibers, said base member having on its surface a copolymer as defined above, and (2) a cured epoxy resin.

COUPLING AGENT FOR EPOXY RESIN COMPOSITE ARTICLES

This invention relates to a coupling agent useful in the preparation of epoxy resin composite articles.

More specifically, this invention relates to a coupling agent which is an aqueous dispersion of a copolymer consisting essentially of from 33 to 86 percent by weight of $C_6H_5(CH_3)SiO$ units and 14 to 67 percent by weight of $R_2N-A-SiO_{3/2}$ units, wherein each R is selected from the group consisting of the hydrogen atom, alkyl radicals containing from one to six carbon atoms and aminoalkyl radicals containing from two to six carbon atoms and A is an alkylene radical containing from three to 10 carbon atoms, and the nitrogen atom of the $R_2N-$ group is attached to at least the third carbon atom of the A radical removed from the silicon atom. The coupling agent can also be an aqueous dispersion of the fatty acid amine salt of the copolymer defined above.

This invention further relates to a composite article consisting essentially of (1) a base member selected from the group consisting of glass cloth and glass fibers, said base member having on its surface a copolymer consisting essentially of from 33 to 86 percent by weight of $C_6H_5(CH_3)SiO$ units and 14 to 67 percent by weight of $R_2N-A-SiO_{3/2}$ units wherein each R is selected from the group consisting of the hydrogen atom, alkyl radicals containing from one to six carbon atoms and aminoalkyl radicals containing from two to six carbon atoms A is an alkylene radical containing from three to 10 carbon atoms, and the nitrogen atom of the $R_2N-$ group is attached to at least the third carbon atom of the A radical removed from the silicon atom, and (2) a cured epoxy resin.

Numerous materials both silicone and nonsilicone have been tried and recommended for the preparation of composite articles in which glass is the base member. One of the biggest problems which has been encountered with the use of such coupling agents, especially the silicones, is the stiffness of the base member when a glass fabric is used. Such stiffness is undesirable because of the problems which arise in attempting to use the fabric, for example, the problems in trying to shape the fabric in making contour wet layups. Another problem frequently encountered is the poor wetout of the resins on the treated base member. In addition to the foregoing it is also essential that the composite articles have good flexural and compressive strengths and that they retain these strengths under wet conditions. It has been found in accordance with this invention that the aforedescribed coupling agent significantly reduces or overcomes the problems of stiffness and resin wetout and, in addition, produces composite articles whose flexural and compressive strengths are at least equivalent to or in some instances superior to the strengths obtained with the heretofore known coupling agents.

As noted above, the coupling agent of this invention is an aqueous dispersion of a copolymer consisting essentially of from 33 to 86, preferably 50 to 80, percent by weight of $C_6H_5(CH)SiO$ units and 14 to 67, preferably 20 to 50, percent by weight of $R_2N-A-SiO_{3/2}$ units. As can be seen from the foregoing, the first unit is a phenylmethylsiloxane unit and is completely described by the formula above.

The second unit can be described generally as being an amino-functional siloxane unit in which the amino functionality is joined to the silicon atom by an alkylene radical A consisting of three to 10 carbon atoms. By way of illustration, A can be $-(CH_2)_3-$, $-(CH_2)_4-$, $-(CH_2)_6-$, $-(CH_2)_{10}-$, $-CH_2CH(CH_3{}_2-$, $-CH_2CH(C_2H_5)CH_2CH_2CH_2CH_2-$ or $-CH_2CH(CH_3)CH_2CH(CH_3)CH_2-$.

The amino portion of the substituent $R_2N-A-$ can be either a primary, secondary or tertiary amine. Preferably the amino portion is a primary or secondary amine. That is to say, preferably both or one of the R groups is a hydrogen atom, however, as noted above, R can also be an alkyl radical containing from one to six carbon atoms, or an aminoalkyl radical containing from two to six carbon atoms. Thus, by way of illustration R in addition to being a hydrogen atom can also be a methyl, ethyl, propyl, isopropyl, butyl, isobutyl, amyl, hexyl, $H_2NCH_2CHB2-$, $H_2N(CH_2)_3-$ or $H_2N(CH_2)_6-$ radical.

The coupling agent of this invention is best prepared by the process set forth in U.S. Pat. No. 3,355,424, the disclosure of which is incorporated herein by reference. Briefly, this process consists of reacting a hydroxyl endblocked phenylmethylsiloxane polymer which can be described by the general formula OH $[C_6H_5(CH_3)SiO]_nH$, wherein $n$ is an integer, with a silane of the formula $R_2N-A-Si(OR')_3$ wherein R and A are as defined heretofore and R' is an alkyl radical, preferably containing from one to three carbon atoms, with up to 60 percent of the theoretical equivalent of water needed to hydrolyze the alkoxy group, by contacting the polymer and the silane (i.e. mixing them) in liquid phase. The reaction to form the copolymer takes place by merely contacting the reactants in liquid phase. Often, however, the reaction will proceed rather slowly at room temperature so it is preferable to expedite the matter by heating the reaction mixture at, for example, 50 to 200° C. with best results being in the range of 65 to 150° C. Heating also tends to drive the reaction toward completion, i.e. toward the formation of the maximum number of new siloxane linkages, particularly when the byproduced alcohol is removed.

The fatty acid amine salt of the copolymer can then be prepared by simply adding an appropriate amount of the appropriate fatty acid to the copolymer dispersion. While the fatty acids can contain from one to 18 carbon atoms, preferably the acid employed to make the salt contains no more than eight total carbon atoms. Specific examples of suitable fatty acids that can be used to make the salts include formic, acetic, propanoic, butyric (butanoic), valeric (pentanoic), caproic (hexanoic), 2-ethyl hexanoic, palmitic and stearic acids.

The copolymers or the fatty acid amine salts thereof, as prepared above, are used in the form of aqueous dispersions. These aqueous dispersions are prepared by adding a solution of the copolymer as prepared to water with agitation. The relative amounts of the solution of the copolymer and water used will depend on the percent of copolymer desired in the final dispersion. This is not critical and for practical purposes will generally be within 0.1 to 10 percent by weight of copolymer in the dispersion with a range of 0.1 to 1 percent being preferred.

As stated above, this invention also includes a composite article that is a laminated or molded article which consists essentially of (1) a base member selected from the group consisting of glass cloth and glass fibers said base member having on the surface a copolymer as defined above and (2) a cured epoxy resin.

The copolymer can be applied to the glass cloth or fibers by various means. For example, the aqueous dispersion of the copolymer can be brushed, sprayed or padded onto the glass cloth or fibers or they can be dipped into the aqueous dispersion and then dried. Generally speaking, it is desirable that about 0.1 to 1 percent by weight, based on the weight of the glass, of the copolymer be deposited on the glass. The surface of the base member need not be completely covered with the copolymer. It is adequate if at least part of its surface contains the copolymer.

Any liquid or solid epoxy resin can be employed in this invention. These epoxy resins are well known to those skilled in the art and hence they will only be described briefly and generally here. These materials are basically the reaction products of polyhydric phenols with either polyfunctional halohydrins of polyepoxides or mixtures of the two. Most commonly, the epoxy resins are a reaction product of bisphenol-A (p,p'-dihydroxydiphenyldimethylmethane) and epichlorohydrin. The term "epoxy resin" or its equivalents as used herein is intended to include the well known combined or modified epoxy resins (such as the epoxy-novolak, epoxy-phenolic, epoxy-melamine and epoxy-silicone resins) as well as the bisphenol-A type of epoxy resins. These combined or modified resins can be used in the form of copolymers, blends or mixtures. In general, the solid epoxy resins are the preferred materials for the preparation of molded articles whereas the liquid epoxy resins are the preferred materials for the preparation of laminates. Procedures for preparing laminates and molded articles are well known to those skilled in the art and are illustrated in the examples below.

Now, in order that those skilled in the art may better understand how the present invention can be practiced, the following examples are given by way of illustration and not by way of limitation.

EXAMPLE 1

To a three-necked flask equipped with agitator, condenser and thermometer there was added 100 g. of a hydroxyl endblocked phenylmethylsiloxane polymer. To this polymer there was added with agitation 100 g. of $H_2NCH_2CH_2NH(CH_2)_3Si(OCH_3)_3$. The mixture was heated with agitation to 70° C. and held at that temperature for 90 minutes. Then a previously prepared mixture of 54 g. of acetic acid and 146 g. of isopropanol was added with agitation which caused the temperature to drop to about 60° C. The mixture was then heated to 60° C. and held there for 30 minutes. The mixture was then allowed to cool to room temperature. The resulting product is the acetate salt of the copolymer consisting of 50 percent by weight of $(C_6H_5)CH_3SiO$ units and 50 percent by weight of $H_2NCH_2CH_2NH(CH_2)_3SiO_{3/2}$ units. This copolymer has a pH of approximately 7 and is water soluble.

EXAMPLE 2

The procedure of example 1 was repeated except that 160 g. of the polymer was used and 40 g. of the amino-functional silane was used. Also the premix consisted of 21.6 g. of acetic acid and 178.4 g. of the isopropanol. The resulting product of this example consisted of about 80 percent by weight of the phenylmethylsiloxane units and 20 percent by weight of the amino-functional siloxane units. In the preparation of this copolymer, when the premix was added, instead of the temperature dropping a high exotherm was noted and therefore the mixture had to be cooled to 60° C. before maintaining it at that temperature for 30 minutes. The copolymer of this example also had a pH of about 7 and was water soluble.

EXAMPLE 3

Aqueous dispersions of the copolymers prepared in the two preceding examples were made by adding the copolymer solution as prepared into water using about 50 percent of the solution and 50 percent water. This gives an aqueous dispersion containing about 0.6 percent by weight of the copolymer salt. Heat-cleaned glass cloth was dipped into the above-prepared aqueous dispersions and then allowed to dry. This gives a weight pickup of the copolymer solids on the dried cloth of about 0.3 percent. Laminates were prepared containing 12 plies of the treated glass cloth (laid up with the warp threads rotated 90° in alternate plies) impregnated with an epoxy resin, the laminate being cured for about 30 minutes at 30 p.s.i. and 100° C. to form a molded sheet having a thickness of about 120 mils and containing about 30 percent by weight of the cured epoxy resin. The epoxy resin employed was DER 331 which is a low molecular weight liquid epoxy resin prepared by the reaction of epichlorohydrin and bisphenol-A. This is a commercial resin which has typical properties of 11,000 to 16,000 c.p.s. viscosity, an epoxy equivalent weight in the range of 187 to 193 and a specific gravity of 1.17. The flexural strengths of these laminates were determined in accordance with the U.S. Federal Specification L–P406b –Method 1031 and compressive strengths were determined in accordance with method 1021 of that specification. Flexural strengths were also determined on samples of the laminates which had been boiled in water for 2 hours, and in some cases 72 hours, and then wiped dry. The 2 hour boil test is recognized as roughly equivalent to standing in water at room temperature for 1 month. The "percent retention" is determined by multiplying the flexural strength after boiling by 100 and dividing by the strength of the laminate as molded. An increase in strength of the laminates after boiling indicates that the laminate as molded was not quite fully cured and further curing took place during the boiling which more than offset any slight decrease in strength which may have been brought about by exposure to the water. For purposes of comparison, a control laminate was prepared in the same way from the same glass cloth and epoxy resin, but the glass cloth employed was not treated in any way. The results of these tests are set forth in the table below.

| Treatment on cloth | Flexural strengths (p.s.i.) | | | Percent retention | | Compressive strengths (p.s.i.) | | Percent retention, 2 hr. boil | Fabric hand |
|---|---|---|---|---|---|---|---|---|---|
| | As molded | 2 hr. boil | 72 hr. boil | 2 hr. boil | 72 hr. boil | As molded | 2 hr. boil | | |
| Copolymer Ex. 1 | 75,000 | 73,000 | 57,900 | 97.4 | 77.1 | 40,000 | 36,000 | 90.0 | Medium. |
| Copolymer Ex. 2 | 80,000 | 77,000 | 64,700 | 96.3 | 81.0 | 37,000 | 40,000 | 108.0 | Soft. |
| None (control) | 66,000 | 51,000 | 27,000 | 77.4 | 40.9 | 39,000 | 29,000 | 74.4 | Medium. |

EXAMPLE 4

When the copolymers below are substituted for the copolymers of example 3 in the preparation of laminates, similar results are obtained.

(A) 35% $C_6H_5(CH_3)SiO$
    65% $H_2N(CH_2)_3SiO_{3/2}$ (B) 45% $C_6H_5(CH_3)SiO$
    55% $H_2NCH_2CH_2NH(CH_2)_3SiO_{3/2}$    2-ethylhexoate salt (C) 55% $C_6H_5(CH_3)SiO$
    45% $H_2NCH_2CH_2NH(CH_2)_{10}SiO_{3/2}$ (D) 65% $C_6H_5(CH_3)SiO$
    35% $C_6H_{13}NH(CH_2)_3SiO_{3/2}$ (E) 75% $C_6H_5(CH_3)SiO$
    25% $H_2N(CH_2)_6NH(CH_2)_3SiO_{3/2}$ (F) 85% $C_6H_5(CH_3)SiO$
    15% $CH_3NH(CH_2)_3SiO_{3/2}$ (G) 80% $C_6H_5(CH_3)SiO$
    20% $H_2NCH_2CH_2NHCH_2CH(CH_3)CH_2SiO_{3/2}$

EXAMPLE 5

When chopped glass fibers are treated with aqueous dispersions of the copolymers of examples 1, 2 and 4, dried, and then mixed with a powdered, solid epoxy resin and molded, a composite article having improved strength is obtained when compared with an article made in the same manner without treating the glass fibers.

That which is claimed is:

1. A composite article consisting essentially of (1) a base member selected from the group consisting of glass cloth and glass fibers, said base member having on its surface a copolymer consisting essentially of from 33 to 86 percent by weight of $C_6H_5(CH_3)SiO$ units and 14 to 67 percent by weight of $R_2N-A-SiO_{3/2}$ units wherein each R is selected from the group consisting of the hydrogen atom, alkyl radicals containing from one to six carbon atoms and aminoalkyl radicals containing from two to six carbon atoms and A is an alkylene radical containing from three to 10 carbon atoms, and the nitrogen atom of the $R_2N-$ group is attached to at least the third carbon atom of the A radical removed from the silicon atom, and (2) a cured epoxy resin.

2. A composite article as defined in claim 1 wherein the base member has a fatty acid amine salt of the copolymer on its surface.

3. A composite article as defined in claim 1 which is a laminate consisting essentially of (1) a base member of glass cloth, said base member having on its surface a copolymer consisting essentially of from 50 to 80 percent of the phenylmethylsiloxane units and 20 to 50 percent of the amino-functional siloxane units, and wherein each R is a hydrogen atom, and (2) a cured epoxy resin.

4. A composite article as defined in claim 3 wherein the base member has a fatty acid amine salt of the copolymer on its surface, said fatty acid containing from one to eight carbon atoms.

5. A composite article as defined in claim 1 which is a molded article consisting essentially of (1) a base member of glass fibers, said base member having on its surface a copolymer consisting essentially of from 50 to 80 percent of the phenylmethylsiloxane units and 20 to 50 percent of the amino-functional siloxane units, and wherein each R is a hydrogen atom, and (2) a cured epoxy resin.

6. A composite article as defined in claim 5 wherein the base member has a fatty acid amine salt of the copolymer on its surface, said fatty acid containing from one to eight carbon atoms.

* * * * *